(12) United States Patent
Schwank et al.

(10) Patent No.: US 12,234,136 B2
(45) Date of Patent: *Feb. 25, 2025

(54) DEVICE FOR STABILIZING TELESCOPIC SCISSORS WITH A PLURALITY OF TRACTION PARTS

(71) Applicant: Siemens Aktiengesellschaft, Munich (DE)

(72) Inventors: Andreas Schwank, Kelsterbach (DE); Peter Janssen, Dieburg (DE)

(73) Assignee: Siemens Aktiengesellschaft, Munich (DE)

( * ) Notice: Subject to any disclaimer, the term of this patent is extended or adjusted under 35 U.S.C. 154(b) by 193 days.

This patent is subject to a terminal disclaimer.

(21) Appl. No.: 17/748,124

(22) Filed: May 19, 2022

(65) Prior Publication Data

US 2022/0411232 A1    Dec. 29, 2022

(30) Foreign Application Priority Data

May 21, 2021  (EP) .................................. 21175288

(51) Int. Cl.
*B66F 7/06*    (2006.01)
(52) U.S. Cl.
CPC .................... *B66F 7/065* (2013.01)
(58) Field of Classification Search
CPC .... B66F 7/065; B66F 7/28; B66F 7/02; B66F 3/22; B66F 11/042; E04G 1/22

(Continued)

(56) References Cited

U.S. PATENT DOCUMENTS

| 4,273,242 A | * | 6/1981 | Schaper | B66C 13/06 |
| | | | | 212/319 |
| 4,516,663 A | * | 5/1985 | D'Alessio | B66B 9/022 |
| | | | | 187/270 |

(Continued)

FOREIGN PATENT DOCUMENTS

| CN | 101023019 | 8/2007 |
| CN | 208648629 U | 3/2019 |

(Continued)

OTHER PUBLICATIONS

EP Search Report dated Dec. 16, 2021 based on EP21175288.6 filed May 21, 2021.

*Primary Examiner* — Brian D Keller
*Assistant Examiner* — Jason Khalil Hawkins
(74) *Attorney, Agent, or Firm* — Cozen O'Connor

(57) ABSTRACT

A device for lifting and stabilizing loads includes a frame and a cross-beam arranged below the frame, wherein the device receives the load and, via lifting structure fastened to the cross-beam, is adjustable for height and can be stabilized via two crossing telescopic struts, where one internal tube and one external tube are interconnected, connection of the telescopic struts is established via three form-fitting traction parts, one first form-fitting traction part in the internal tube of a telescopic strut is mounted at both ends via respective inner and outer disks, a third form-fitting traction part is mounted on two rotatable disks, the disks of the respective first and third traction parts situated on one side are interconnected such that rotational movements between both disks are transmittable, and where the respective first form-fitting traction part is fastened on the inner wall of the two external tubes.

11 Claims, 1 Drawing Sheet

(58) Field of Classification Search
USPC .......................................................... 254/122
See application file for complete search history.

(56) References Cited

U.S. PATENT DOCUMENTS

2007/0252120 A1* 11/2007 Assmann ................ B66C 13/06
  254/264
2007/0272489 A1 11/2007 Putnam
2017/0362060 A1* 12/2017 Turek .................... B66B 23/026

FOREIGN PATENT DOCUMENTS

| DE | 3636459 | 4/1988 |
| DE | 19613341 | 10/1997 |
| DE | 10024075 | 11/2001 |
| DE | 102004045516 | 4/2006 |
| DE | 102020003226 | 12/2021 |
| RU | 2385284 C1 | 3/2010 |

* cited by examiner

→ Lowering
⇨ Lifting

DEVICE FOR STABILIZING TELESCOPIC SCISSORS WITH A PLURALITY OF TRACTION PARTS

BACKGROUND OF THE INVENTION

1. Field of the Invention

The invention relates to an assembly having telescopic struts that are coupled in a synchronized manner and, more particularly, a device for lifting and stabilizing loads, in particular suspension gear for vehicles or vehicle parts, composed of a frame as well as a cross-beam that lies below the frame and receives the load and, via hoist ropes fastened to the cross-beam, is adjustable for height, and which can be stabilized via two crossing telescopic struts that extend substantially in an imaginary vertical plane parallel to the direction of travel of the frame and that are pivotably articulated on the frame, on the one hand, and on the cross-beam, on the other hand.

2. Description of the Related Art

Devices for lifting and stabilizing loads are used, above all, in automotive assemblies to transport vehicle parts or the vehicle to be assembled between the individual assembling locations in the respective stage of assembly of the vehicle. For this purpose, the frame is usually horizontally displaceable on a rail; the cross-beam via the hoist ropes articulated thereon is adjustable for height by means of hoists disposed on the frame.

The suspension of the load ideally should be stable, in particular when the vehicle is one that is provided for assembly. Such a requirement is because many assembly procedures are performed in a fully automated manner that necessitates precise positioning of the carrying device which, in turn, requires the load to be suspended in an ideally stable manner on the cross-beam. Simple rope drives having vertical supporting ropes are not suitable for safely preventing the load from swaying to the same extent in all directions. As a result, articulated arms or scissors are used in addition to the guy ropes, where articulated arms or scissors are articulated on the frame, on the one hand, and on the cross-beam, on the other hand, and stabilize the load against swaying or oscillation or against rotary vibration without impeding the lifting and lowering movements.

The numerous conventional solutions are complex, heavy and expensive. Thus, a generic device for guiding a load, which is composed of a displaceable frame, so to speak, on which a cross-beam is articulated so as to be adjustable for height is described in German patent application DE 36 36 459 A1.

In order for functional groups for lifting and lowering loads (i.e., "suspension gear") in the field of material handling to be stabilized, telescopic struts ("telescopes") are often used. An internal tube that is repositioned in an external tube here is retracted or deployed during the lifting or lowering movement. In order for reciprocating movements of the load in and counter to the displacement direction of the frame to be avoided, two such length-adjustable telescopic struts are provided here so as to cross one another between the frame and the cross-beam, where the telescopic struts in the end regions thereof are fastened in an articulated manner to the cross-beam, on the one hand, and to the frame, on the other hand, and serve to absorb the forces that arise in the travel direction of the carrying device.

The lifting of the load in the case of this solution occurs via the hoist ropes that are articulated in the corner regions of the cross-beam and via deflection rollers in the corner regions of the frame are guided to a lifting device (e.g., drive with rope drums) disposed centrally on the frame. In order for the retraction and deployment movement of the telescopic struts to be synchronized, the telescopic struts are stabilized and synchronized via a rope assembly of tensioning ropes.

Such assemblies with rope-based synchronization are disclosed in DE 10 2004 045 516 A1—Aβmann "Device for lifting and stabilizing loads", where a rope guide that synchronizes the movement of the telescopes is chosen such that lateral reciprocating movements are damped.

Disadvantages, for example, because continual twisting and untwisting of the steel ropes typically utilized, and thus stretching of the ropes and wear arises, as a result of the ropes being guided via the pivot bearings of the telescopic struts, are derived from the described effect of the guy ropes in the prior art discussed. The issue in terms of construction thus causes an undesirable longitudinal variation of the telescopic struts as a consequence of forces engaging in the longitudinal direction of the cross-beam. The stretching of the ropes regularly must be compensated for by re-tensioning and periodic adjustment; the same applies to jigging, slippage and other deviations which may arise over time. Moreover, assembling, adjusting and servicing are not trivial matters and are thus expensive and time-consuming.

SUMMARY OF THE INVENTION

In view of the foregoing, it is therefore an object of the present invention to provide a construction for synchronizing the displacement of the telescopic struts, where the construction is structurally simple, functional and low-maintenance and where, as a core concept of object in accordance with the invention, bracing and stabilization of the telescopic struts is implemented with the aid of at least two form-fitting traction parts (e.g. toothed belts).

This and other objects and advantages are achieved in accordance with the invention particular by a device for lifting and stabilizing loads, in particular a suspension gear for vehicles or vehicle parts, composed of a frame as well as a cross-beam that lies below the frame and receives the load and, via lifting structure fastened to the cross-beam, is adjustable for height, and which can be stabilized via two crossing telescopic struts that extend substantially in an imaginary vertical plane parallel to the displacement direction of the frame, which are pivotably articulated on the frame, on the one hand, and on the cross-beam, on the other hand, which each have one internal tube and one external tube and in turn are connected to one another for synchronized retraction and deployment so as to counter undesirable length variations as a result of forces acting in the longitudinal direction of the cross-beam.

The connection of the telescopic struts here is established by three form-fitting traction parts, where in each case one first form-fitting traction part in the internal tube of a telescopic strut is in each case mounted at both ends via a respective inner disk and an outer disk, where a third form-fitting traction part is mounted on two rotatable disks so as to be horizontal between the two telescopic struts, where the disks of the respective first traction part and the third traction part that are each situated on one side are connected to one another such that rotational movements between both disks can be transmitted, and where the respective first form-fitting traction part is fastened on the inner wall of the two external tubes such that a rotational movement of the first disks leads to a corresponding synchronous displacement of the telescopic struts. Structurally simple and low-maintenance stabilization of a lifting device is thus provided.

The first traction parts are each advantageously formed by a toothed belt, and the inner and the outer disks are configured as toothed belt pulleys. This results in silent and uniform running. Moreover, toothed belts are stable in the long term, such that periodic readjustment by virtue of instances of stretching of the traction part is often dispensed with.

In one alternative embodiment, the first traction parts are each formed by a chain, and the inner and the outer disks are configured as sprockets. Chains here can often transmit higher forces than toothed belts. Moreover, chain solutions can often also be used in the case of problematic operating conditions or constricted installation conditions. Depending on the requirements, embodiments containing a mix of chains and toothed belts can also be used. Depending on the use conditions, toothed belts, chain solutions or else rotary transmissions (e.g., shaft drives having deflection gearboxes on both sides, e.g., spur gear toothing), or combinations thereof, can be used selectively or else in combination with one another for the second form-fitting traction part, thus the "transverse connection" for transmitting the information pertaining to the movement between the telescopic struts; in this context all these solutions can be referred to as a form-fitting traction part.

The outer disk and the disk of the third traction part connected thereto are advantageously disposed on a common rotation axis so that torques are transmitted directly between the two disks.

The outer disks and the respective disks of the third traction part situated on the same side are particularly advantageously disposed coaxially with the pivot bearing of the respective internal tube so that no length compensation of the first and/or of the third traction part is required when the assembly is displaced (lifted/lowered).

In particular with a view to the adjustment in the course of the initial assembly, but also for maintenance purposes, at least on one side it is advantageous for the outer disk of the first traction part and for that disk of the third traction part that is disposed on this side to be connected via a coupling that is set to at least partially decouple the outer disk of the first traction part and the disk of the third traction part.

The traction parts are advantageously provided with a tensioning device which, in terms of the first traction part, is advantageously disposed within the respective internal tube such that the tensioning device is to be activated from the outside, for example, via a maintenance opening. The tensioning device of the third traction part can be implemented because the bearing blocks of the pivot bearings on at least one of the internal tubes, and thus the disks disposed coaxially therewith, are displaceable, for example, via slots in the screw-fitting to the cross-beam. Other tensioning devices, for example, via a pair of deflection rollers, are possible.

The coupling can advantageously be formed as a safety coupling, where the safety coupling is set to at least partially decouple when a critical torque is exceeded. A destruction of other components, in particular of toothed belts or chains, can thus be prevented in the event of load peaks. The safety coupling in a simple and effective construction is formed by a shear pin or a feather key having a predetermined breaking point, where, in the closed state of the safety coupling, a transmission of a rotational movement of at least one of the disks to the respectively adjacent disk of the other traction part is provided via the shear pin or the feather key.

In one embodiment, the pivot bearings of the internal tubes, the outer disks and the second traction part having the assigned rotatable disks are disposed on a lower cross-beam of the device, and the pivot bearings of the external tubes are articulated on the upper frame. In this way, most of the maintenance jobs can be performed with a lowered lifting device, so as to be readily accessible close to the ground. In contrast, in an alternative embodiment, the pivot bearings of the internal tubes, the outer disks and the second traction part having the assigned rotatable disks are disposed on the upper frame of the device, and the pivot bearings of the external tubes are articulated on the lower cross-beam. In this way, installation space on the lower cross-beam can be saved. Moreover, the second traction part having the drive elements (disks) is better protected in relation to collisions in the lower region.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of a telescopic strut in accordance with the invention will be explained hereunder by way of the drawings, in which.

DETAILED DESCRIPTION OF THE EXEMPLARY EMBODIMENTS

Figure 1:
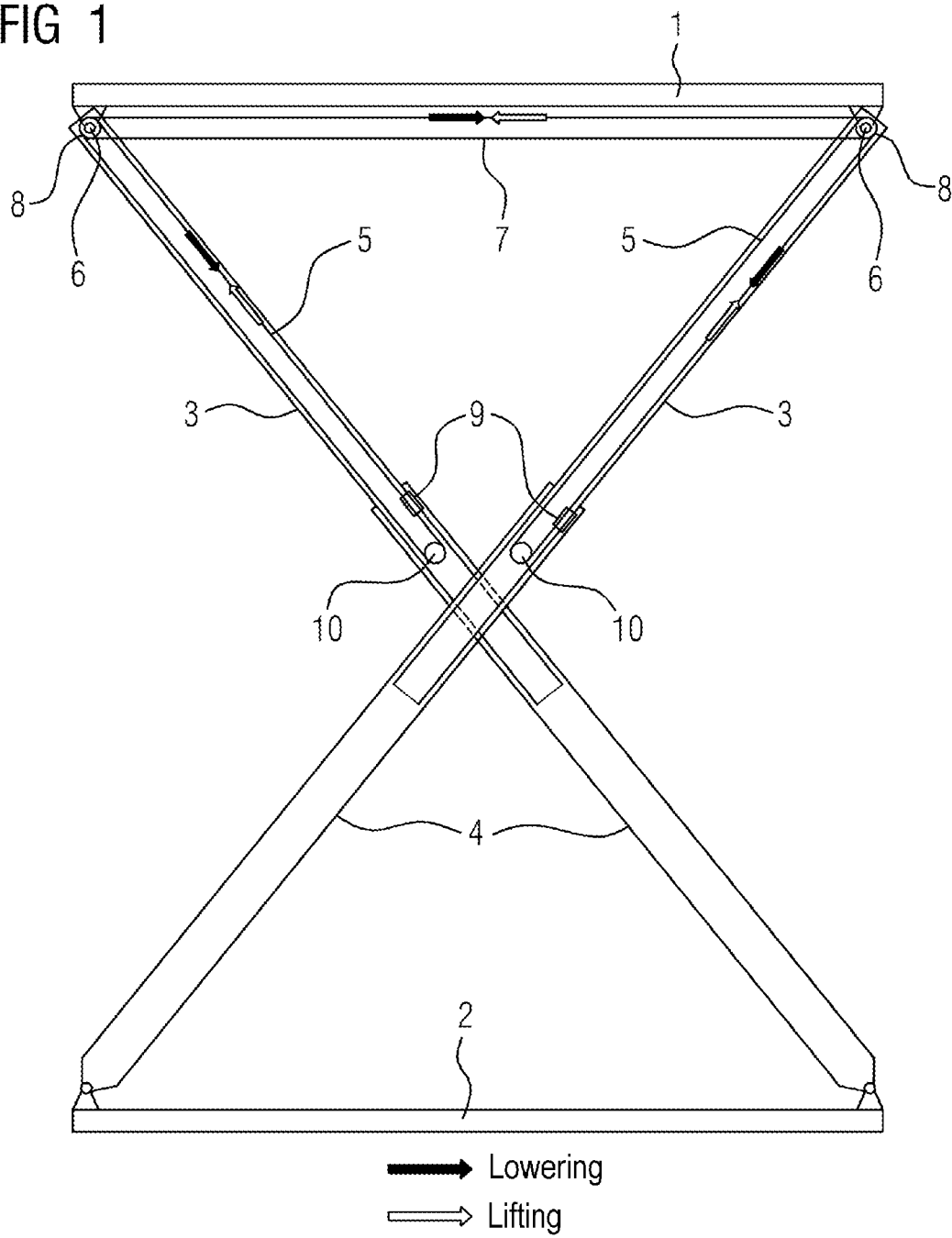
FIG. 1 shows a lateral view (sectional illustration) of the lowered device in accordance with the invention.

FIG. 1 shows an assembly for stabilization (suspension gear), in which ropes or belts (not shown in FIG. 1) are used as lifting structure between the upper frame 1 and the cross-beam 2 (also referred to as "lower frame"). Transverse movements (swaying) of the lower cross-beam 2 must be prevented in particular in the lowered state. To this end, FIG. 1 shows bracing and stabilizing of telescopic struts via three form-fitting traction parts 5 (one in each telescope) and 7, where the telescopic struts are disposed so as to cross one another between the upper frame 1 and the cross-beam 2 and are composed of an internal tube 3 and an external tube 4. For this purpose, toothed belts are used here. Alternatively, the toothed belts 5, 7 can be replaced by chains or other traction or transmission structure.

Two of the three form-fitting traction parts 5 (toothed belts), as "first traction parts", are each mounted at both ends in the internal tube 3 of a telescopic strut via in each case two disks 6 (outer disk) and 10 (inner disk)—presently: toothed belt pulleys. A third form-fitting traction part 7 (e.g. toothed belt) is likewise mounted on two (toothed belt pulleys) disks 8 so as to be horizontal between the two telescopic struts below the upper frame. The (toothed belt pulleys) disks 6, 8 that are situated on one side are mounted such that rotational movements can be transmitted between both disks 6, 8. The external tube 4 and the internal tube 3 in each of the two telescopic struts are movably connected to one another via a clamping plate 9 that connects the traction part 5 (toothed belt) to the external tube 4.

When the external tube 4 in a first one of the telescopic struts is retracted or deployed relative to the associated internal tube 3, the traction part 5 (e.g., toothed belt) moves as a result of the fixed connection to the clamping plate 9, and the (toothed belt pulley) disk 6 in the internal tube begins to rotate. The rotational movement of this (toothed belt pulley) disk 6, which is situated on the upper frame in or on the internal tube 3 of the first telescopic strut, is transmitted to the directly adjacent (toothed belt pulley) disk 8 of the third form-fitting traction part 7 (toothed belt). This traction part 7 (horizontally disposed toothed belt) likewise begins to move in the same direction and in turn transmits the rotational movement to the (toothed belt pulley) disk 8 on the opposite side. As a result, the rotational movement is directed onward to the (toothed belt pulley) disk 6 that is mounted in the second telescopic strut below the upper frame. The transmitted rotational movement leads to a movement of the traction part 5 (toothed belt) in the internal tube 3 of the second telescopic strut, and as a result of the connection to the clamping plate 5 in turn to the external tube 4 being deployed or retracted relative to the associated internal tube 3. The rotating direction is balanced as a result of the clamping plate 9 being disposed on the upper side in one telescope and on the lower side in the other telescope.

As a result of this principle, both external tubes 4 are at all times displaced in a synchronous manner, both during retraction as well as deployment of the telescopic struts. This prevents an undesirable longitudinal variation of the telescopic struts as a consequence of forces engaging in the longitudinal direction of the cross-beam, and the construction stabilizes itself, i.e., any offset or swaying of the cross-beam 2 in the travel direction in relation to the upper frame 1 (to the left or right in terms of FIG. 1) is reliably prevented. An offset or swaying in the transverse direction (orthogonal to the drawing plane in terms of FIG. 1) is prevented in particular when the telescopic struts have a T-shaped bearing flange (orthogonal to the drawing plane) and thus can pivot only within the plotted plane, and in this way prevent transverse swaying orthogonal to the drawing plane or rotating swaying of the cross-beam 2 in relation to the upper frame 1.

Figure 2:
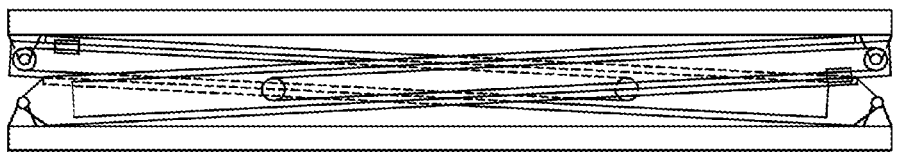
FIG. 2 shows the device in the retracted (lifted) state in accordance with the invention.

FIG. 2 shows the assembly from FIG. 1 in a state with retracted telescopic struts.

In one advantageous embodiment, the guiding of the internal tube in the external tube of the telescopic strut occurs with sliding blocks instead of the otherwise often customary roller bearings or ball bearings, where the sliding blocks are simple to manufacture. For easy assembly, these sliding blocks are pushed into corresponding openings in the external tube from the outside, and guide the internal tube. The sliding blocks are preferably produced from a material with positive frictional properties, such as a plastic material. This is a low-maintenance embodiment. As a result of assembling occurring from the outside, any readjustment (for example, by replacing spacers between the external tube and a bearing face of the sliding blocks/sliders), or a replacement of the sliding blocks, is readily possible. This moreover results in play-free and silent running.

As a result of the above-described construction and the embodiments thereof discussed, both internal tubes 3 are displaced in the respective external tubes 4 in a synchronous manner when the telescopic struts are retracted as well as deployed. This prevents any undesirable variations in length of the telescopic struts as a result of forces acting in the longitudinal direction of the cross-beam, in particular when the lifting device is started or braked; the construction is self-stabilizing and swaying back and forth of the lower cross-beam, in particular in the lowered state, is minimized or prevented.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for lifting and stabilizing loads, comprising:
a frame; and
a cross-beam arranged below the frame, the device receiving the load and, via lifting structure fastened to the cross-beam, being adjustable for height, and being stabilized via two crossing telescopic struts which extend substantially in an imaginary vertical plane parallel to a displacement direction of the frame and which are pivotably articulated on the frame and pivotably articulated on the cross-beam, each of the crossing telescopic struts having one internal tube and one external tube and being connected to one another so as to be displaced in a synchronized manner and counter undesirable length variations as a result of forces acting in a longitudinal direction of the cross-beam;
wherein the connection of the two telescopic struts is established via three form-fitting traction parts;
wherein one respective first form-fitting traction part in the internal tube of a telescopic strut mounted at both ends via a respective inner disk and an outer disk;
wherein a third form-fitting traction part is mounted on two rotatable disks which are arranged entirely above the cross-beam so as to be horizontal between the two telescopic struts;
wherein the disks of the respective first traction part and the third traction part which are each situated on one side are concentrically and coaxially aligned, and connected to one another such that rotational movements between both disks are transmittable; and
wherein the respective first form-fitting traction part is fastened on an inner wall of the two external tubes such that a rotational movement of the outer disks leads to a corresponding synchronous displacement of the respective telescopic strut.

2. The device as claimed in claim 1, wherein the first traction part is formed as a toothed belt, and the outer disks are configured as toothed belt pulleys.

3. The device as claimed in claim 1, wherein the first traction part is formed by a chain, and the inner and the outer disks are configured as sprockets.

4. The device as claimed in claim 1, wherein the outer disk and the disk of the third traction part connected thereto are each disposed on a common rotation axis.

5. The device as claimed in claim 4, wherein a rotation axis is disposed coaxially with a pivot axis of the internal tube of each respective telescopic strut.

6. The device as claimed in claim 1, wherein at least on one side the outer disk of the first traction part and that disk of the third traction part which is disposed on this side are connected via a coupling; and wherein the coupling is set to at least partially decouple the outer disk of the first traction part and the disk of the third traction part.

7. The device as claimed in claim 6, wherein the coupling is formed as a safety coupling which is set to at least partially decouple when a critical torque is exceeded.

8. The device as claimed in claim 7, wherein the safety coupling has a predetermined breaking point; and wherein, in a closed state of the safety coupling, a transmission of a rotational movement of at least one of the disks to the respectively adjacent disk of another traction part is provided via the safety coupling.

9. The device as claimed in claim 1, wherein the outer disks and the second traction part having assigned rotatable disks are disposed on the cross-beam of the device.

10. The device as claimed in claim 1, wherein the outer disks and the second traction part having the assigned rotatable disks are disposed on the frame of the device.

11. The device as claimed in claim 1, wherein the load to be stabilized comprises suspension gear for vehicles or vehicle parts.

* * * * *